United States Patent Office 3,381,781
Patented May 7, 1968

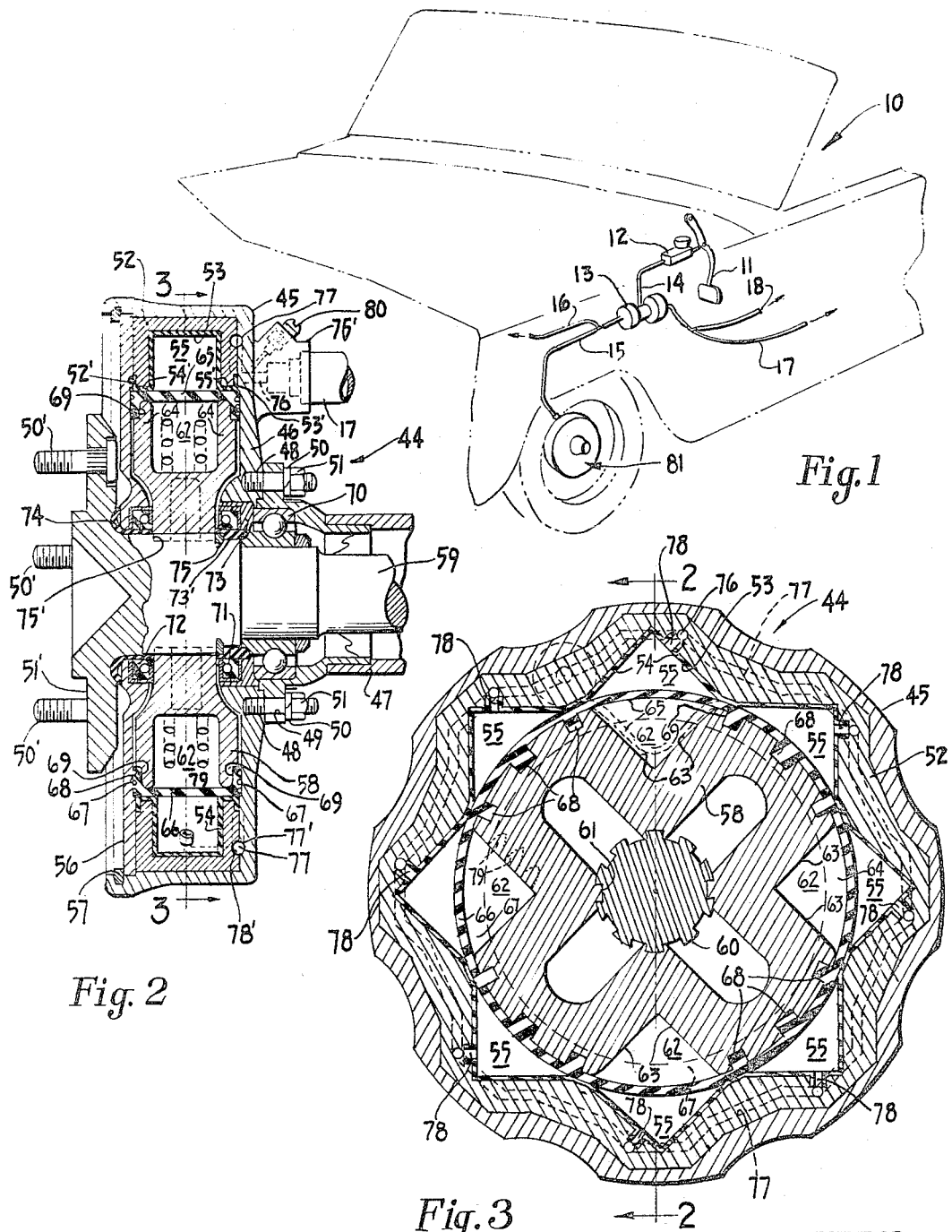

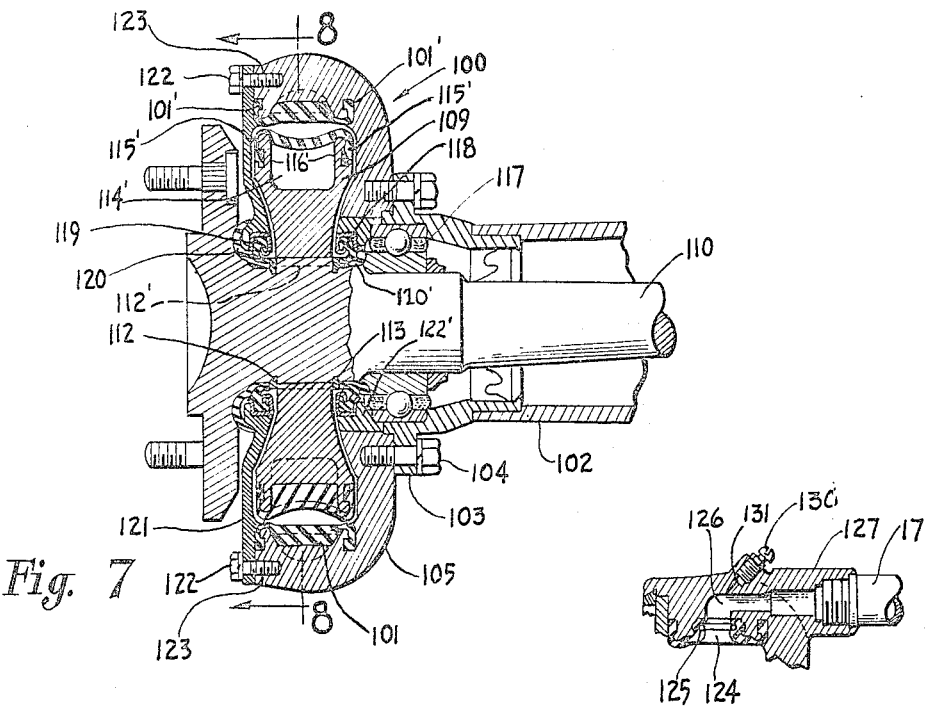
Fig. 7
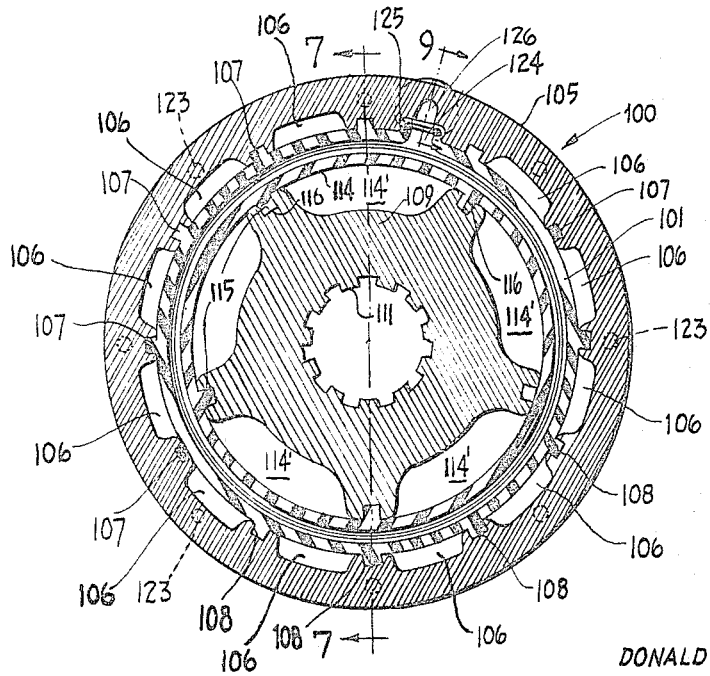
Fig. 8
Fig. 9
INVENTOR.
DONALD V. SUMMERVILLE, JR.
BY
Joseph P. Gastel
ATTORNEY.

3,381,781
LIQUID IMPACT ROTARY BRAKE
Donald V. Summerville, Jr., 103 Russell St.,
Buffalo, N.Y. 14214
Filed Aug. 30, 1965, Ser. No. 483,484
7 Claims. (Cl. 188—90)

ABSTRACT OF THE DISCLOSURE

A fluid brake including a blind housing having a stator and a rotor therein, a source of pressurized fluid, and conduit means for injecting pressurized fluid into opposed cavities in said rotor and stator to provide a braking action in response to the increasing of the pressure of said fluid.

---

The present invention relates to a fluid brake and to an improved braking method which may be utilized for the purpose of providing a braking action for vehicles and other devices wherein braking is effected by terminating movement between relatively movable parts.

In the past braking was generally effected by frictional contact between relatively movable members. This type of action had certain disadvantages including fading and grabbing. In addition, the parts which engaged each other with a frictional contact were subject to wear and consequently required periodic replacement. Furthermore, the braking action or deceleration obtainable by friction-type of brakes was severely limited by both heat generated as a result of the frictional contact and moisture. In addition friction brakes required periodic adjustment. It is with the overcoming of the foregoing shortcomings of friction-type brakes that the present invention is concerned.

It is accordingly one object of the present invention to provide a fluid brake which can provide improved braking action and therefore increased deceleration between relatively movable parts because friction between these parts is eliminated. A related object of the present invention is to provide a fluid brake which will not grab or fade and thus provide a more uniform braking action.

A further related object of the present invention is to provide a fluid brake in which the braking action can be very closely controlled. A related object is to provide an improved brake which operates with equal efficacy in effecting both forward and reverse braking.

Another object of the present invention is to provide a fluid brake containing parts which do not wear relative to each other because friction between these parts is eliminated, thus causing the brake to be capable of lasting indefinitely in the sense that it does not wear with use. A related object is to provide a brake which does not require periodic adjustment.

A further object of the present invention is to provide an improved brake system and an improved braking method for terminating movement between relatively movable parts. Other objects and attendant advantages of the present invention will readily be perceived hereafter.

In its broadest aspect the fluid brake of the present invention comprises a first member, a second member relatively movable with respect to said first member, and means for confining fluid between said members comprising first cavities in said first member facing said second member, second cavities in said second member facing said first member, and means for conducting pressurized fluid to both the space between said first and said second members and said first and said second cavities to thereby cause the fluid which is trapped in said first and second cavities to provide a braking action which impedes relative movement between said first and second members. The improved method comprises the steps of injecting fluid between said first and second members so as to flow into said first and second cavities and thereafter increasing the pressure of said fluid to thereby provide the braking action.

The fluid braking system of the present invention includes a fluid brake of the above mentioned type and in addition includes a reservoir for hydraulic fluid and means for placing the hydraulic fluid under pressure and causing it to enter the fluid brake to provide the above described braking action.

In its more specific aspect, the fluid brake is intended to be embodied in a construction wherein the first member is a rotor and the second member is a stator so that the existence of pressurized fluid in the cavities which face each other causes the pressurized fluid to tend to impede relative rotation therebetween to thus provide a braking action. Since it is the confining of the pressurized fluid in the opposed first and second cavities which provides the actual braking action, there is no appreciable frictional contact between the stator and the rotor which may result in wear of relatively movable parts. In addition, since the braking action is produced as a result of confining pressurized fluid, the fading and grabbing which was characteristic of previous types of friction brakes is virtuely obviated. By controlling the pressure of the fluid which is injected between the stator and the rotor the rate of braking action can be very closely controlled. In addition, because the braking action is not limited by heat which is generated as a result of frictional contact, as is the case with friction-type of brakes, a relatively fast braking action can be obtained.

The fluid brake of the present invention can be used in any application wherein it is desired to terminate movement between relatively movable parts. More specifically, the fluid brake of the present invention may be used in automotive vehicles, in machine tools, in aircraft, or anywhere else where it is required that relative movement between parts be controlled. The fluid brake of the present invention is particularly adaptable for use in instrumentalities containing a centralized hydraulic system which supplies the necessary hydraulic fluid for its operation. The present invention will be more fully understood when the following portions of the specification are read in conjunction with the accompanying drawings wherein:

FIGURE 1 is a fragmentary perspective view of an automotive vehicle mounting the improved fluid brake of the present invention;

FIGURE 2 is a view, partially in cross section, taken substantially along line 2—2 of FIGURE 3 and showing one embodiment of the fluid brake of the present invention which is intended to be used for the rear wheels of an automobile;

FIGURE 3 is a view partially in cross section, taken substantially along line 3—3 of FIGURE 2;

FIGURE 7 is a view, partially in cross section, taken along line 7—7 of FIGURE 8 and showing an alternate fluid brake construction;

FIGURE 8 is a view substantially along line 8—8 of FIGURE 7; and

FIGURE 9 is a view taken along line 9—9 of FIGURE 8 and showing the porting for conducting pressurized fluid to the brake.

Figure 4:
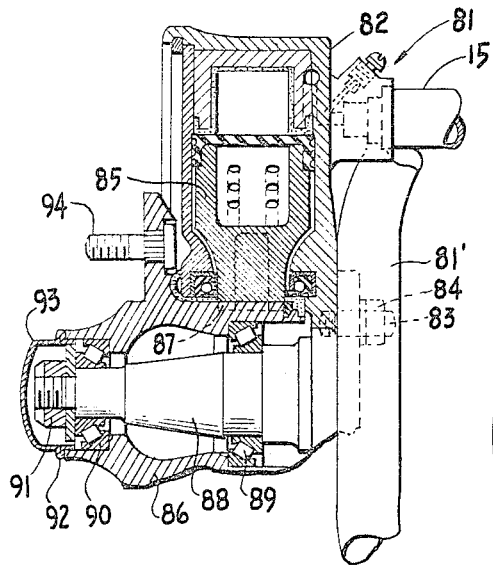
FIGURE 4 is a fragmentary cross sectional view, similar to FIGURE 2, but showing a construction for mounting a fluid brake on the front wheels of the vehicle.
Figure 6:
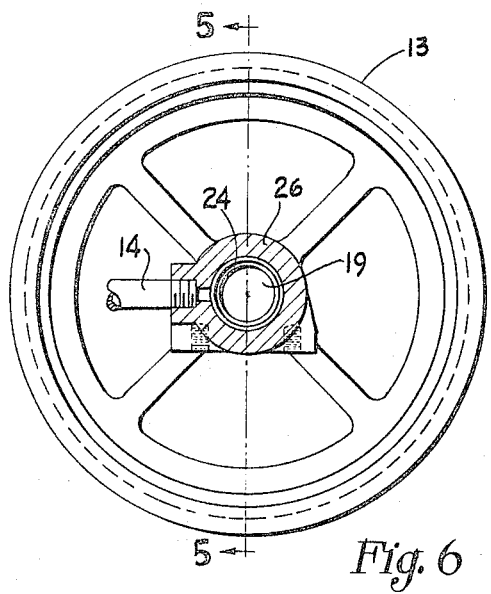
FIGURE 6 is a view, partially in cross section, of the reservoir of FIGURE 5 taken substantially along line 6—6 of FIGURE 5.

In FIGURE 1 an automotive vehicle 10 is shown having a brake pedal 11 suitably mounted thereon and located in operative engagement with a master cylinder 12, which may be of any type conventional in the art. An hydraulic fluid reservoir 13 is in communication with master cylinder 12 through conduit 14. Reservoir 13 in turn has conduits 15 and 16 in communication therewith which in turn are in communication with the brakes in the front wheels of the vehicle. In addition, conduits 17 and 18 extend from the other side of reservoir 13 and are in communication with the rear brakes of the vehicle.

Whenever brake pedal 11 is depressed, hydraulic fluid will be forced from master cylinder 12 into chamber 19 (FIG. 5) of reservoir 13 to exert hydraulic force on the opposed faces 20 and 21 of pistons 22 and 23, respectively, leakage being minimized by sealing portions 24 and 25 on said pistons. Pistons 22 and 23 will move to the right and to the left, respectively, in housing 26 and thus cause a corresponding movement of pistons 27 and 28, respectively, against the bias of springs 29 and 30, respectively, which are interposed between pistons 27 and 28 and the end walls 31 and 32, respectively, of housing 26. Piston 27 is housed within chamber 33 and piston 28 is housed within chamber 34. A seal 35 is located between the outer edge of piston 27 and chamber wall 36 to minimize leakage of hydraulic fluid from chamber 33 as piston 27 moves to the right. A seal 37 is mounted on the peripheral edge of piston 28 and provides sealing with wall 38 to thereby minimize leakage of hydraulic fluid in chamber 34 past piston 28 as the latter moves to the left. Annular piston bumper seals 39 and 40 are mounted at the ends of the narrow central portion of housing 26 to absorb the shock of pistons 27 and 28, respectively, as the latter move back to the position shown in FIG. 5 under the urging of springs 29 and 30, respectively, when brake pedal 11 is released. The differences in area between piston faces 20 and 27 and between pistons 21 and 28 is for the purpose of properly balancing the brake pedal pressure and the pressure of the fluid at the brakes.

Figure 5:
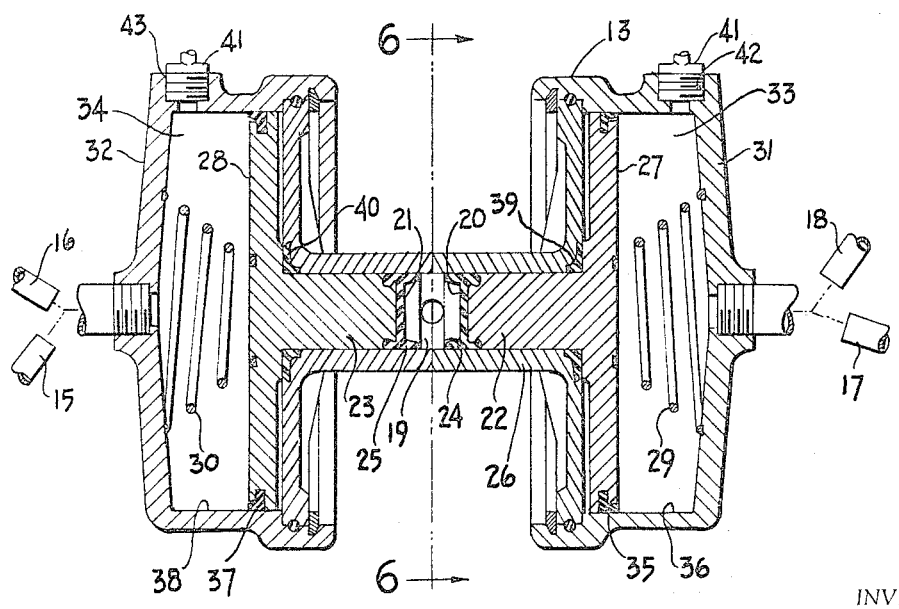
FIGURE 5 is a view, partially in cross section, taken substantially along line 5—5 of FIGURE 6 and showing an hydraulic power reservoir for the fluid actuated brakes of FIGURES 1 to 4 and also showing how the brakes for the four individual wheels of a vehicle can be divided into two independent sets of two brakes each.

As can be seen from FIGURE 5, chamber 34 is in communication with conduits 15 and 16 leading to the front brakes and chamber 33 is in communication with conduits 17 and 18 leading to the rear brakes. Thus, in essence there are two separate braking systems for the vehicle, namely, one for the front brakes and one for the rear brakes. Therefore, in the event that either conduits 15 or 16 should rupture there still will be braking supplied by the brakes associated with conduits 17 and 18. In the event that conduits 17 or 18 should rupture, the brakes in communication with conduits 15 and 16 will still be capable of providing a braking action. Plugs 41 are threaded into apertures 42 and 43, said apertures serving as combination fill and bleed holes to permit suitable hydraulic fluid, such as is commonly used with hydraulic brake systems, to be poured into chambers 33 and 34 and for permitting the air in said chambers to be expelled.

In FIGURES 2 and 3 the construction of the rear fluid brake unit 44 is shown. One of these units is associated with each rear wheel. The fluid brake unit 44 includes a brake housing 45 having annular wall 46 which is secured to the axle housing 47 by means of circumferentially spaced screws 48 which thread into annular portion 46 and extend through apertures 49 in the axle housing and mount lock washers 50 and nuts 51 which secure said brake housing 45 to the axle housing 47. It will be appreciated that as many screws 48 are utilized as required to effect a rigid mounting. Mounted within housing 45 is a brake stator 52. As can be seen from FIGURE 3 stator 52 and housing 45 essentially occupy a keyed relationship relative to each other because of their mating noncircular peripheral contours and therefore there can be no relative rotation therebetween. A plastic combination bearing, seal, and liner member 53 covers the inner peripheral surface 54 of stator 52. As can be seen from FIG. 3, a plurality of cavities 55, which are substantially triangular in cross section, are circumferentially spaced on the inner periphery of stator 52. An end housing plate 56 is mounted within housing 45 and retained therein by a snap-ring type of retainer 57, said plate 56 holding the stator 52 in position within housing 45.

The bearing, sealing and liner functions of member 53 are as follows: The extreme end portions 52' and 53' act as seals between the outer surface of the stator and plate 56, and between the outer surface of the stator and the inner surface of annular wall 46, respectively. The bearing function is performed by edges 54' and 55' which bear against rotor diaphragm 65, as will become more apparent hereinafter. The liner function is performed by the portions of liner 53 which engage the walls 54 of cavities 55.

Also forming part of the fluid brake 44 is a rotor 58 having a central portion keyed on the axle shaft 59 by means of mating splines 60 on said axle shaft and splines 61 on the central portion of rotor 58. The external periphery of rotor 58 has cavities 62 formed therein, each of said cavities being bounded by walls 63 which essentially form a V or triangle in cross section, (FIG. 3) and by side walls 64 (FIG. 2). A rotor compression band or diaphragm 65 encircles the outer peripheral portion of rotor 58 and in addition to having outer circular peripheral portion 66 also includes opposed side flanges 67. The mounting of compression band 65 is effected by spaced lugs 68 formed integrally therewith which are received in recesses 69 in rotor 58.

Rotor 58 is held against axial movement on axle 59 by snap ring retainer 75 at one side thereof and axle shoulder 75' on the other side thereof. Axle 59 rotates relative to axle housing 47 because of bearing 70 mounted therebetween. Surrounding the central portion of rotor 58 are inner pressure seal 71 and outer pressure seals 72 for preventing leakage of hydaulic fluid, said pressure seals being supported by inner seal bearing 73 and outer seal bearing 74, respectively, each of which also function as dust shields. The inner seal 71 and inner dust shield 73' are held in position by retainer 73. Each rear vehicle wheel, not shown, is mounted on circumferentially spaced studs 50' which extend from circular plate 51' formed integrally with axle 59.

Whenever brake pedal 11 is depressed to cause piston 27 (FIG. 5) to move to the right against bias of spring 29, hydraulic fluid within chamber 33 will be forced into conduits 17 and 18 leading to the brake units 44 on the rear wheels. An analogous action occurs on the opposite side of housing 26 for causing hydraulic fluid to flow to the brake units 81 on the front wheels through conduits 15 and 16. The hydraulic fluid in conduit 17, which is in communication with housing 45 at nipple 76' (FIG. 2) will pass into conduit 76 which is in communication with manifold 77 formed by adjacent recessed walls 78' and 77', of housing 45 and stator 52, respectively. Manifold 77 in turn is in communication with each of cavities 55 through an associated conduit 78 (FIG. 3). Thus pressurized hydraulic fluid will be forced into cavities 55. At this point it is to be noted that a bleed screw 80 (FIG. 2) is provided for the purpose of bleeding the system in the event that this should become necessary. Otherwise the housing 45 is blind in the sense that the same conduit 17 which conducts fluid to the housing also conducts it away from the housing. The hydraulic pressure, which is built up because housing 45 is blind, in turn will cause diaphragm 65 to distend and approach walls 63 of each of the cavities 62 of rotor 58 until such time as the outer peripheral portions 66 of diaphragm 65 overlying cavities 62 tend to lie against walls 63. This distention is shown in dotted lines in the uppermost cavity 62 in FIG. 3. It will readily be appreciated that a quantity of pressurized hydraulic fluid will be trapped in each of the pairs of opposed cavities 55 and 62. As rotor 58 rotates past the position wherein the cavities are in exact opposition as shown in FIG. 3, one pair of sides 54 and 63 of each pair of cavities will approach each other while the other pair will move away from each other. This can be visualized more clearly by rotating rotor 58 approximately 10° counterclockwise. Thus in the uppermost cavities 55 and 62 (FIG. 3), lower right cavity wall 63 will approach upper left cavity wall 54, and lower left cavity wall 63 will move away from upper right cavity wall 54. The force of the trapped hydraulic fluid opposing the movement of wall 63 toward wall 54 will provide the braking action. At this point it is to be noted that when the outer peripheral portion 66 of diaphragm 65 moves toward walls 63, any air which is trapped in chamber 62 can pass into recesses 79 in walls 63. It will be appreciated that the greater the pressure of the hydraulic fluid in the opposed cavities 55 and 62, the greater will be the braking action, and this pressure can be closely controlled by the pressure on the brake pedal 11.

Upon release of the brake pedal 11, the pressure on the hydraulic fluid will be released and piston 27 will travel back to the position shown in FIGURE 5 in response to the expansion of spring 29. In addition, diaphragm 65, being made of resilient silicone rubber, will resume its original circular configuration and in doing this will force the hydraulic fluid from the cavities 62. In this respect it is to be noted that the hydraulic fluid does not enter cavities 62 behind diaphragm 65 but causes said diaphragm to deflect against walls 63 and enters the cavities 62 when lined by portions 66 of diaphragm 65. Furthermore, any hydraulic fluid which may have entered cavity 62 behind diaphragm 65, that is entered the space between the walls 63 and the diaphragm, will be expelled because of the centrifugal force produced by rotation of rotor 58.

In FIGURE 4 an alternate way of mounting the hydraulic brake is shown. At this point it is to be noted that the rotor and the stator and associated structure are identical in all respects to the structure described above relative to FIGURES 2 and 3. Therefore this structure will not be described again. However, the manner of mounting the fluid brake 81 differs for front wheels. In this respect it is to be noted that a steering knuckle 81' is attached to brake housing 82 by means of screws 83 and nuts 84. This mounting is conventional and therefore will not be described further. This construction fixes the stator of the fluid brake 81. The rotor 85 is mounted on hub 86 by means of a spline connection 87 which may be identical to the splined connection 60–61 described with respect to FIGURES 2 and 3. Hub 86 is in turn mounted on axle 88 by means of bearing 89 cooperating with mating shoulders (not numbered) of the axle and housing and by bearing 90, the hub and the bearings being retained on axle 88 by means of nut 91 and washer 92. A dust seal 93, which fits into housing 86 by a press fit, seals the bearing assembly in a conventional manner. The front wheel is mounted over the end of hub 86 and secured thereto by means of circumferentially spaced screws 94 which cooperate with wheel locking nuts (not shown).

In FIGURES 7, 8 and 9 an alternate embodiment of the present invention is shown. The fluid brake 100 is for the rear wheels of a vehicle and differs from the embodiment of FIGURES 2 and 3 in that a diaphragm 101, which may be made of silicone rubber, is mounted on the stator by means of diaphragm side walls 101' which are received in suitable recesses in the stator. One of the walls 101' of diaphragm 101 also acts as a seal between housing 105 and plate 121. As can be seen from a comparison of FIGURES 2 and 3, on one hand, and 7 through 9, on the other, the structure of the latter figures is simpler. More specifically, the axle housing 102 terminates at annular plate 103 which receives screws 104 which attach housing 105 to plate 103. Housing 105 in turn possesses a plurality of cavities 106 in its inner pheriphery, said cavities being circumferentially spaced thereabout. The compression band diaphragm 101 is held in position by a plurality of circumferentially spaced lugs 107 which are received in recesses 108 in housing 105.

The rotor 109 is attached to axle 110 by means of splines 111 engaging mating splines 112' of the axle. Snap retaining rings 112 and 113 secure rotor 109 against axial movement on the axle 110. An inner compression band or diaphragm 114, which may be made of silicone rubber encircles rotor 109 and is secured thereto by means of lugs 115 which fit within mating recesses 116 on the outer peripheral portions of the rotor and by side walls 115' which fit into mating recesses in the opposed rotor side walls 116'. This construction differs from that of FIGS. 2 and 3 in that a better locking action is obtained.

The axle 110 is mounted for rotation within housing 102 by means of bearing 117, and an inner seal bearing and support 118, which may be made of plastic, is mounted at the base of rotor 109 for the purpose of sealing the relatively movable parts against loss of hydraulic fluid. An outer pressure seal 119 is located on the opposite side of rotor 109 from seal 118 for the same purpose, and dust seals 120 and 120', which may be made out of plastic, function as outer seal bearings. The bearings and seals 119 and 120 are mounted on end plate 121, the outer circumferential portions of which are secured to housing 105 by means of screws 122 which are circumferentially spaced thereabout and are received in tapped apertures 123. A combined retainer for bearing 117 and seal 118 is provided, as shown in FIGURE 7.

As can be seen from FIGURES 8 and 9, diaphragm 114 possesses an aperture 124, the walls of which are reinforced by metal ring 125. This aperture is in communication with conduit 126, which, in turn, is in communication with conduit 17 leading from the hydraulic reservoir (FIG. 5) through nipple 127. Whenever hydraulic fluid is forced into aperture 124 from a reservoir, such as shown in FIGURE 5, this fluid will flow between the inner peripheral surface of diaphragm 101 and the outer peripheral surface of diaphragm 114. This hydraulic fluid under pressure in turn will distend resilient diaphragm 101 outwardly so that it tends to line the walls of cavities 106 and will also distend resilient diaphragm 114 inwardly so that it tends to line the walls of cavities 114' on the outer periphery of the rotor. In this manner the opposed facing cavities of the rotor and stator are filled with pressurized fluid and the existence of this pressurized fluid in the cavities will provide the desired braking action. It is to be especially noted that the embodiment shown in FIGURES 7, 8 and 9 obviates the manifold associated with FIGURES 2 and 3 and thus is much simpler than the structure of these latter figures.

Upon release of pressure from the fluid between the rotor and the stator, as is experienced when the brake pedal 11 is released, the diaphragms 114 and 101 will return to their circular shape shown in FIGURES 8 and 7 because of their inherent resiliency inasmuch as they are made up of silicone rubber and this retun to their normal unstressed configuration along with centrifugal force will expel the hydraulic fluid back through conduit 126 and into conduit 117 leading to the reservoir such as 13. As can be seen from FIGURE 9, a bleed screw 130 is mounted at the end of channel 131 in communication with conduit 126 for the purpose of bleeding air from the system.

The embodiment of FIGURES 7–9 operates in accordance with the same general mode of operation discussed above relative to FIGURES 2 and 3.

It will be appreciated that while the various embodiments have been described as using hydraulic fluid as a braking fluid, compressed gases such as air may also be used under certain circumstances, notwithstanding its compressibility. However, because of the tendency for air to heat up, when compressed and subjected to the action of the rotating rotor, a suitable cooling arrangement could be used to maintain the air at relatively low temperatures. When air is used, small amounts of leakage may be tolerated because of the fact that the air is replaceable from a compressor or the like.

It can thus be seen that the above described fluid brake is manifestly capable of achieving the above enumerate objects, and while preferred embodiments have been shown, it is to be understood that the present invention is not limited thereto but may be otherwise embodied within the scope of the following claims.

I claim:

1. A fluid brake system comprising a rotor, a stator lying outside of said rotor, a first periphery on said rotor facing said stator, a second periphery on said stator facing said rotor, first cavities extending into said rotor from said first periphery, second cavities in said second periphery, yieldable diaphragm means on said first periphery for providing a yieldable closure for said first cavities, means mounting said diaphragm means for rotation with said rotor, and means for injecting pressurized fluid into the space between said yieldable diaphragm means and said second cavities to thereby cause said yieldable diaphragm means to move into said first cavities whereby said first and second cavities effectively provide chambers containing pressurized fluid to thereby impede the relative movement between said rotor and stator, said yieldable diaphragm effectively forcing said fluid from said first cavities upon the release of pressure to thereby permit continued relative rotation between said rotor and said stator.

2. A fluid brake system as set forth in claim 1 wherein the fluid in said first cavities is expelled by a combined return of said yieldable diaphragm means to its undistended condition and by centrifugal force incidental to rotation of said rotor.

3. A fluid brake system comprising a rotor, a stator, a first periphery on said rotor, a second periphery on said stator, said first and second peripheries being adjacent each other, first essentially unconnected cavities in said first periphery, second essentially unconnected cavities in said second periphery, yieldable diaphragm means operatively mounted between said first and said second cavities, means for injecting pressurized fluid between said rotor and said stator to thereby cause said yieldable diaphragm means to distend into certain of said cavities and maintaining said pressure of said fluid in said first and second cavities whereby said pressurized fluid effectively occupies said first and second cavities to resist the relative rotation between said rotor and said stator, said yieldable diaphragm means effectively forcing fluid from said certain of said cavities upon the release of pressure to thereby permit further relative rotation between said rotor and said stator without accompanying resistance from said pressurized fluid.

4. A fluid brake comprising a rotor, a stator, a first periphery on said rotor, a second periphery on said stator, first cavities in said first periphery, second cavities in said second periphery, a first yieldable diaphragm attached to said rotor and overlying said first cavities, a second yieldable diaphragm attached to said stator and overlying said second cavities, and conduit means for conducting pressurized fluid between said first and second diaphragms to thereby cause said first diaphragm to distend into said first cavities and cause said second diaphragm to distend into said second cavities, whereby said pressurized fluid effectively occupies said first and said second cavities to resist the relative rotation between said rotor and said stator.

5. A fluid brake as set forth in claim 4 including a source of hydraulic fluid, means for causing pressurized hydraulic fluid to pass through said conduit means from said source, and wherein said first and said second diaphragms are of sufficient resiliency to effectively expel said hydraulic fluid from said first and second cavities when said means for causing said hydraulic fluid to pass through said conduit means from said source is no longer operative.

6. A fluid brake system comprising a blind housing, a first member in said housing, a second member in said housing relatively movable with respect to said first member, first essentially unconnected cavities in said first member facing said second member, second essentially unconnected cavities in said second member facing said first member, yieldable diaphragm means operatively mounted between said first and second cavities, single conduit means for conducting pressurized fluid to and from said blind housing for delivery to and from said first and second cavities, and means for providing pressurized fluid to said single conduit means for delivery to said first and second cavities and maintaining said pressure of said fluid in said first and second cavities to thereby effect a braking action.

7. A fluid brake system comprising a blind housing, a rotor in said housing, first essentially unconnected cavities in the periphery of said rotor, a stator in said housing, second essentially unconnected cavities in the periphery of said stator, said first and second cavities being located in facing relationship relative to each other, yieldable diaphragm means operatively mounted between said first and second cavities, single conduit means for conducting fluid to and from said housing, and means for injecting pressurized fluid under a selectively variable pressure into said housing through said single conduit means for delivery between said first and second cavities and maintaining said pressure of said fluid in said first and second cavities to thereby provide a braking action between said rotor and stator.

References Cited

UNITED STATES PATENTS

| | | | |
|---|---|---|---|
| 1,149,938 | 8/1915 | Nagelvoort | 188—90 |
| 1,614,119 | 1/1927 | Giovannini | 188—90 |
| 2,695,694 | 11/1954 | Seinfeld | 192—58 |

FOREIGN PATENTS

| | | |
|---|---|---|
| 466,411 | 5/1937 | Great Britain. |

FERGUS S. MIDDLETON, *Primary Examiner.*

MILTON BUCHLER, *Examiner.*

G. E. A. HALVOSA, *Assistant Examiner.*